United States Patent
Lai et al.

(10) Patent No.: US 11,539,977 B2
(45) Date of Patent: Dec. 27, 2022

(54) METHOD AND APPARATUS OF MERGE WITH MOTION VECTOR DIFFERENCE FOR VIDEO CODING

(71) Applicant: MEDIATEK INC., Hsinchu (TW)

(72) Inventors: Chen-Yen Lai, Hsinchu (TW);
Ching-Yeh Chen, Hsinchu (TW);
Tzu-Der Chuang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/263,651

(22) PCT Filed: Jul. 31, 2019

(86) PCT No.: PCT/CN2019/098522
§ 371 (c)(1),
(2) Date: Jan. 27, 2021

(87) PCT Pub. No.: WO2020/024966
PCT Pub. Date: Feb. 6, 2020

(65) Prior Publication Data
US 2021/0306659 A1 Sep. 30, 2021

Related U.S. Application Data

(60) Provisional application No. 62/728,131, filed on Sep. 7, 2018, provisional application No. 62/717,980, filed
(Continued)

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/176* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 6,647,061 B1 * | 11/2003 | Panusopone | H04N 21/23439 375/240.12 |
| 2009/0257500 A1 * | 10/2009 | Karczewicz | H04N 19/192 375/E7.26 |

(Continued)

FOREIGN PATENT DOCUMENTS

| TW | 2017/156705 A1 | 9/2017 |
|---|---|---|
| TW | 201739252 A | 11/2017 |

(Continued)

OTHER PUBLICATIONS

E. Mora, J. Jung, M. Cagnazzo and B. Pesquet-Popescu, "Modification of the merge candidate list for dependent views in 3D-HEVC," 2013 IEEE International Conference on Image Processing, 2013, pp. 1709-1713, doi: 10.1109/ICIP.2013.6738352. (Year: 2013).*

(Continued)

*Primary Examiner* — Stefan Gadomski
(74) *Attorney, Agent, or Firm* — McClure, Qualey & Rodack, LLP

(57) ABSTRACT

A method and apparatus of Inter prediction for video coding using UMVE (Ultimate Motion Vector Expression) are disclosed. According to this method, a base candidate is selected from an original Inter candidate list, where the base candidate has a base prediction direction. One or more extended candidates are derived by adding one or more offsets to the base candidate, where said one or more extended candidates have a same prediction direction as the
(Continued)

base prediction direction. The extended candidates are then inserted into the original Inter candidate list to form an extended Inter candidate list for encoding or decoding. According to another method, the UMVE mode is treated as an additional AMVP (Advanced Motion Vector Prediction) mode.

16 Claims, 8 Drawing Sheets

Related U.S. Application Data on Aug. 13, 2018, provisional application No. 62/712,288, filed on Jul. 31, 2018.

(51) Int. Cl.
*H04N 19/176* (2014.01)
*H04N 19/46* (2014.01)

(56) References Cited

U.S. PATENT DOCUMENTS

| | | | |
|---|---|---|---|
| 2013/0051463 A1* | 2/2013 | Minoo | H04N 19/139 |
| | | | 375/E7.243 |
| 2013/0148738 A1* | 6/2013 | Chouly | H04N 19/105 |
| | | | 375/240.16 |
| 2013/0195188 A1* | 8/2013 | Sugio | H04N 19/132 |
| | | | 375/240.14 |
| 2013/0294513 A1* | 11/2013 | Seregin | H04N 19/513 |
| | | | 375/240.14 |
| 2014/0348241 A1* | 11/2014 | Lim | H04N 19/52 |
| | | | 375/240.16 |
| 2015/0049813 A1* | 2/2015 | Tabatabai | H04N 19/70 |
| | | | 375/240.16 |
| 2015/0078435 A1* | 3/2015 | Taubman | G06T 9/00 |
| | | | 375/240.02 |
| 2015/0195562 A1* | 7/2015 | Li | H04N 19/523 |
| | | | 375/240.02 |
| 2016/0105672 A1* | 4/2016 | Zheng | H04N 19/11 |
| | | | 375/240.02 |
| 2016/0344903 A1* | 11/2016 | Zhou | H04N 19/523 |
| 2017/0295370 A1* | 10/2017 | Xu | H04N 19/176 |
| 2017/0310990 A1* | 10/2017 | Hsu | H04N 19/577 |
| 2018/0084260 A1* | 3/2018 | Chien | H04N 19/513 |
| 2018/0098063 A1* | 4/2018 | Chen | H04N 19/139 |
| 2018/0098089 A1* | 4/2018 | Chen | H04N 19/521 |
| 2019/0141319 A1* | 5/2019 | Moon | H04N 19/159 |
| 2019/0200040 A1 | 6/2019 | Lim et al. | |
| 2019/0208199 A1* | 7/2019 | Cho | H04N 19/105 |
| 2019/0215512 A1* | 7/2019 | Lee | H04N 19/186 |
| 2020/0021804 A1* | 1/2020 | Jun | H04N 19/176 |
| 2020/0204799 A1* | 6/2020 | Lee | H04N 19/11 |

FOREIGN PATENT DOCUMENTS

| | | |
|---|---|---|
| WO | 2013/070757 A1 | 5/2013 |
| WO | 2018/012886 A1 | 1/2018 |

OTHER PUBLICATIONS

J. Chen et al., "Scalable Video Coding Extension for HEVC," 2013 Data Compression Conference, 2013, pp. 191-200, doi: 10.1109/DCC.2013.27. (Year: 2013).*

S. Jeong, et al., "CE4 Ultimate motion vector expression in J0024 (Test 4.2.9)", in Joint Video Exploration Team (JVET) of ITU-T SG 16 WP 3 and ISO/IEC JTC I/SC 29/WG 11, 11th Meeting: Ljubljana, SI, I 0-18 Jul. 2018, Document: JVET-KO 115) (Year: 2018).*

International Search Report and Written Opinion dated Oct. 23, 2019, issued in application No. PCT/CN2019/098522.

Sugio, T., et al.; "Parsing Robustness for Merge/AMVP," Joint Collaborative Team on Video Coding (JCT-VC) of ITU-T SG16 WP3 and ISO/IEC JTC1/SC29/WG11; Jul. 2011; pp. 1-50.

Chinese language office action dated Oct. 28, 2020, issued in application No. TW 108127192.

Akula, S.N., et al.; "Description of SDR, HDR and 360° video coding technology proposal considering mobile application scenario by Samsung, Huawei, GoPro, and HiSilicon;" buJoint Video Exploration Team (JVET) of ITU-T SG 16 WP 3 and ISO/IEC JTC 1/SC 29/WG 11; Apr. 2018; pp. 1-120.

* cited by examiner

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | | |
| 4 | | |

410

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | (0,0),ref0 | (0,0),ref0 |
| 4 | (0,0), ref1 | (0,0), ref1 |

| amvp_idx | L0 |
|---|---|
| 0 | mvL0_A |
| 1 | mvL0_B |
| 2 | |

| amvp_idx | L1 |
|---|---|
| 0 | mvL1_A |
| 1 | |
| 2 | |

432

440

| amvp_idx | L0 |
|---|---|
| 0 | mvL0_A |
| 1 | mvL0_B |
| 2 | (0,0) |

| amvp_idx | L1 |
|---|---|
| 0 | mvL1_A |
| 1 | (0,0) |
| 2 | |

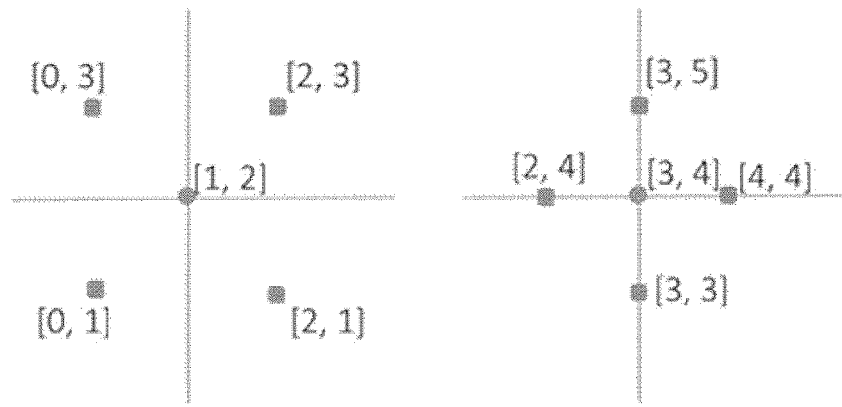
*Fig. 6A*  *Fig. 6B*
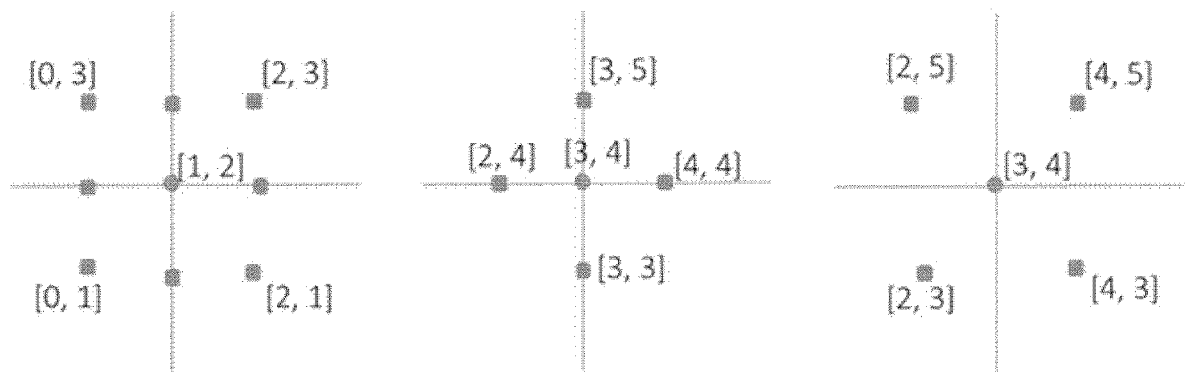
*Fig. 7A*  *Fig. 7B*  *Fig. 7C*

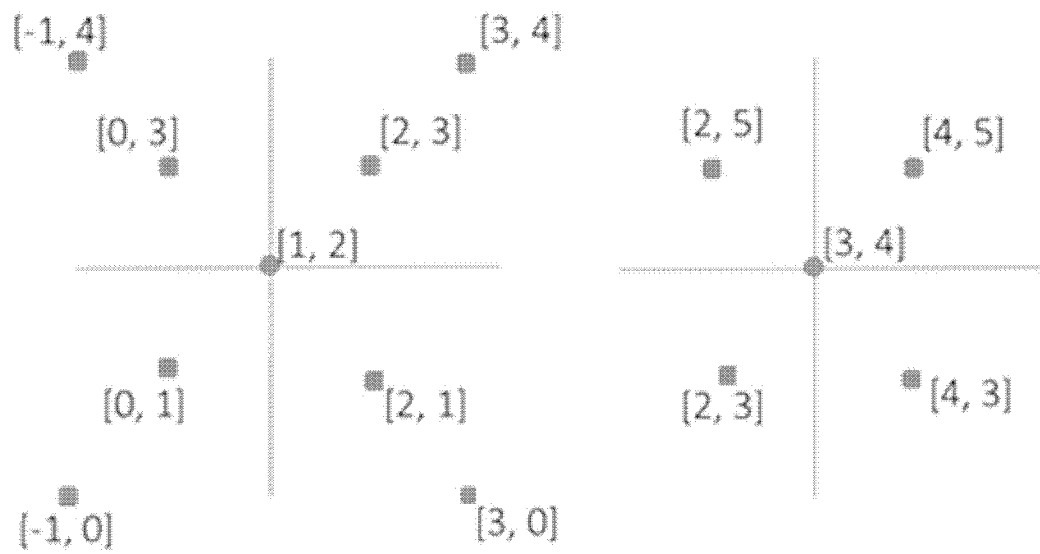
*Fig. 8A*  *Fig. 8B*
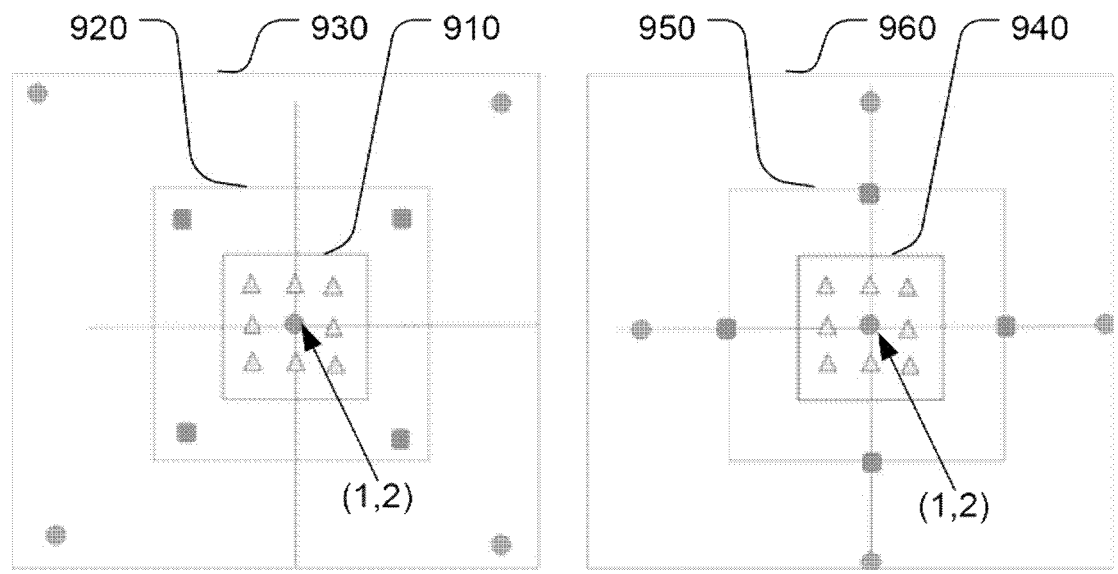
*Fig. 9A*  *Fig. 9B*

METHOD AND APPARATUS OF MERGE WITH MOTION VECTOR DIFFERENCE FOR VIDEO CODING

CROSS REFERENCE TO RELATED APPLICATIONS

The present invention claims priority to U.S. Provisional Patent Application, Ser. No. 62/712,288, filed on Jul. 31, 2018, U.S. Provisional Patent Application, Ser. No. 62/717,980, filed on Aug. 13, 2018 and U.S. Provisional Patent Application, Ser. No. 62/728,131, filed on Sep. 7, 2018. The U.S. Provisional Patent Applications are hereby incorporated by reference in their entireties.

FIELD OF THE INVENTION

The present invention relates to Inter prediction for video coding using UMVE (Ultimate Motion Vector Expression). In particular, the present invention discloses various methods to extend the UMVE expansion so as to improve the coding performance and/or to reduce the complexity.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

FIG. 1 shows an example of neighbouring PUs used to derive the spatial and temporal MVPs for both AMVP and Merge scheme. In AMVP, the left MVP is the first available one from $A_0, A_1$, the top MVP is the first available one from $B_0, B_1, B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0, B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 1, up to four spatial Merge index are derived from $A_0, A_1, B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates.

FIG. 2 illustrates an example of the derivation process for combined bi-predictive Merge candidate. The candidate set 210 corresponds to an original candidate list, which includes mvL0_A, ref0 (231) in L0 and mvL1_B, ref (232) in L1. A bi-prediction MVP 233 can be formed by combining the candidates in L0 and L1.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate 330 is shown in FIG. 3, where candidate list 310 corresponds to an original candidate list and candidate list 320 corresponds to the expanded candidate list including two generated bi-prediction MVPs.

In candidate type 3, Zero vector Merge/AMVP candidates are created by combining zero vectors and reference index, which can be referred. FIG. 4A illustrates an example for adding zero vector Merge candidates, where candidate list 410 corresponds to an original Merge candidate list and candidate list 420 corresponds to the extended Merge candidate list by adding zero candidates. FIG. 4B illustrates an example for adding zero vector AMVP candidates, where candidate lists 430 (L0) and 432 (L1) correspond to original AMVP candidate lists and the candidate list 440 (L0) and 442 (L1) correspond to the extended AMVP candidate lists by adding zero candidates. If zero vector candidates are not duplicated, it is added to Merge/AMVP candidates list.

In JVET-K0115 (S. Jeong, et al., "*CE4 Ultimate motion vector expression in J0024 (Test 4.2.9)*", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0115), ultimate motion vector expression (UMVE) proposed in JVET-J0024 (S. Akula, et. Al., "*Description of SDR, HDR and 360° video coding technology proposal considering mobile application scenario by Samsung, Huawei, GoPro, and HiSilicon*", in Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0024) is presented. FIG. 5A illustrates an example of UMVE search process for a current block 512 in the current frame 510. Frame 520 in reference list L1 and frame 530 in reference list L1 correspond to the two references for bi-prediction. Line 540 corresponds to a line through the centre of the current block 512 and two corresponding pixels in frames 520 and 530. The search is performed around the centre points associated with line 540 (e.g. lines 542 and 544). In order to simplify the search process, only specific locations around the centre point vertically and horizontally will be searched as shown in FIG. 5B for L0 reference (550) and L1 reference (552). UMVE is used for either Skip or Merge modes with a proposed motion vector expression method. UMVE re-uses the same Merge candidate as VVC (Versatile Video Coding) standard being developed. Among the Merge candidates, a candidate can be selected, and is further expanded by the proposed motion vector expression method. UMVE provides a new motion vector expression with simplified signalling. The expression method includes prediction direction information, starting point, motion magnitude, and motion direction.

This technique uses a Merge candidate list as is. However, only candidates that are default Merge type (MRG_TYPE_DEFAULT_N) are considered for UMVE's expansion. Prediction direction information indicates a prediction direction among L0, L1, and L0 and L1 predictions. In B slice, the proposed method can generate bi-prediction candidates from Merge candidates with uni-prediction by using mirroring technique. For example, if a Merge candidate is uni-prediction with L1, a reference index of L0 is decided by searching a reference picture in list 0, which is mirrored with the reference picture for list 1. If there is no corresponding picture, the nearest reference picture to the current picture is used. The MV of L0 is derived by scaling MV of L1. The scaling factor is calculated by POC (picture order count) distance.

If the prediction direction of the UMVE candidate is the same as one of the original Merge candidate, the index with value 0 is signalled as an UMVE prediction direction. However, if the prediction direction of the UMVE candidate is not the same as one of the original Merge candidate, the index with value 1 is signalled. After signalling the first bit, remaining prediction direction is signalled based on the pre-defined priority order of UMVE prediction direction. Priority order is L0/L1 prediction, L0 prediction and L1 prediction. If the prediction direction of Merge candidate is L1, Code '0' is signalled for UMVE' prediction direction L1. Code '10' is signalled for UMVE' prediction direction L0 and L1. Code '11' is signalled for UMVE' prediction direction L0. If L0 and L1 prediction lists are the same, UMVE's prediction direction information is not signalled.

Base candidate index defines the starting point. Base candidate index indicates the best candidate among candidates in the list as shown in Table 1.

TABLE 1

| Base candidate IDX | 0 | 1 | 2 | 3 |
|---|---|---|---|---|

The distance indices for various distances are shown in Table 2.

TABLE 2

| Distance IDX | 0 | 1 | 2 | 3 | 4 | 5 | 6 | 7 |
|---|---|---|---|---|---|---|---|---|
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown in Table 3.

TABLE 3

| Direction IDX | 00 | 01 | 10 | 11 |
|---|---|---|---|---|
| x-axis | + | − | N/A | N/A |
| y-axis | N/A | N/A | + | − |

To reduce the encoder complexity, block restriction is applied. If either width or height of a CU is less than 4, UMVE is not performed.

It is desirable to further improve the performance and/or to reduce the complexity related to UMVE.

BRIEF SUMMARY OF THE INVENTION

A method and apparatus of Inter prediction for video coding are disclosed. According to this method, input data related to a current block in a current picture is received at a video encoder side or a video bitstream corresponding to compressed data including the current block in the current picture is received at a video decoder side. A base candidate is selected from an original Inter candidate list, where the base candidate has a base prediction direction. One or more extended candidates are derived by adding one or more offsets to the base candidate, where said one or more extended candidates have a same prediction direction as the base prediction direction. The extended candidates are then inserted into the original Inter candidate list to form an extended Inter candidate list. Current motion information associated with the current block is encoded using the extended Inter candidate list at the video encoder side or the current motion information associated with the current block is decoded at the video decoder side using the extended Inter candidate list.

The offsets are added to the base candidate in multiple directions and the multiple directions include one target direction being non-horizontal nor non-vertical. In one embodiment, the multiple directions consist of eight directions including four horizontal and vertical directions and four diagonal directions. In one embodiment, the offsets correspond to a group of offsets.

In one embodiment, the offsets are selected from a group of offsets. For example, a value of the offsets is selected depending on a target directions where said one or more offsets are added to the base candidate. In another example, a target direction for the offsets to add to the base candidate depends on a target motion vector of the base candidate. In another example, a number of the offsets depends on a target motion vector of the base candidate or a target directions where said one or more offsets are added to the base candidate. In another example, when AMVR (adaptively motion vector resolution) is applied to the current block, the offsets are selected to have a different magnitude from a precision selected by the AMVR.

In one embodiment, extended candidates are inserted into the extended Inter candidate list and the extended Inter candidate list is updated in a first-in-first-out (FIFO) fashion.

In one embodiment, only a target uni-prediction candidate in the original Inter candidate list is selected as the base candidate and the target uni-prediction candidate is converted into a bi-prediction base candidate using a mirroring technique for deriving said one or more extended candidates.

In one embodiment, the offsets are added to the base candidate in a x-direction or y-direction conditionally.

In one embodiment, the original Inter candidate list is derived for Skip, Merge, AMVP, affine Merge mode, affine AMVP mode, or sub-block Merge mode.

According to another method of the present invention, a current mode flag for the current block is signalled at the video encoder side or the current mode flag for the current block is parsed at the video decoder side, where UMVE (Ultimate Motion Vector Expression) mode is indicated by a UMVE mode flag corresponding to an additional AMVP (Advanced Motion Vector Prediction) mode. If the current mode flag indicates the UMVE mode being used for the current block: a base candidate is determined from an original Inter candidate list; one or more extended candidates are derived by adding one or more offsets to the base candidate; the extended candidates are inserted into the original Inter candidate list to form an extended Inter candidate list; and current motion information associated with the current block is encoded using the extended Inter candidate list at the video encoder side or the current motion information associated with the current block is decoded at the video decoder side using the extended Inter candidate list. The extended candidates are treated as MVDs (Motion Vector Differences) in the AMVP mode.

In one embodiment, the UMVE mode flag is signalled before an affine flag for the current block. In this case, if the UMVE mode flag indicates that the UMVE mode is enabled for the current block, the affine flag for the current block is not signalled and the affine flag is inferred to be a predefined value.

In another embodiment, the UMVE mode flag is signalled after an affine flag for the current block. In this case, if the affine flag indicates that an affine mode is enabled for the current block, the UMVE mode flag is not signalled for the current block.

In another embodiment, if the UMVE mode flag indicates that the UMVE mode is enabled for the current block, additional motion information is signalled for the base candidate. The additional motion information may comprise prediction direction, reference frame index, MVP (Motion Vector Predictor) index, or a combination thereof is signalled for the base candidate. According to one embodiment, if the base candidate is uni-prediction, the base candidate is converted to bi-prediction by a mirroring technique and the additional motion information is associated with only one reference list. According to another embodiment, if the base candidate is uni-prediction, the base candidate is converted to bi-prediction by a symmetric MVD (Motion Vector Difference) technique and the additional motion information is associated with only one reference list.

In another embodiment, if the UMVE mode flag indicates that the UMVE mode is enabled for the current block, only an MVP (Motion Vector Predictor) index is signalled as motion information for the base candidate.

BRIEF DESCRIPTION OF THE DRAWINGS

FIG. 4A illustrates an example of adding zero vector Merge candidates, where the candidate list on the left corresponds to an original Merge candidate list and the candidate list on the right corresponds to the extended Merge candidate list by adding zero candidates.

FIG. 4B illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.

FIG. 6A illustrates an example of the first UMVE, where the UMVE is extended by direction-2 MVD.

FIG. 6B illustrates an example of the second UMVE, where the UMVE is extended by direction-1 MVD.

FIG. 7A illustrates an example of the first UMVE's expansion, where the expansion is extended in eight directions.

FIG. 7B illustrates an example of the second UMVE's expansion, where the expansion is extended with direction-1 MVD.

FIG. 7C illustrates an example of the second UMVE's expansion, where the expansion is extended with direction-2 MVD.

FIG. 8A illustrates an example of the first UMVE's expansion, where the expansion is extended with MVD set 1.

FIG. 8B illustrates an example of the second UMVE's expansion, where the expansion is extended with MVD set 2.

FIG. 9A illustrates an example of the UMVE's expansion, where the expansion is extended with 16 additional MVs in direction-2 by a set of MVD.

FIG. 9B illustrates an example of the second UMVE's expansion, where the expansion is extended with 16 additional MVs in direction-1 by a set of MVD.

DETAILED DESCRIPTION OF THE INVENTION

Figure 1:
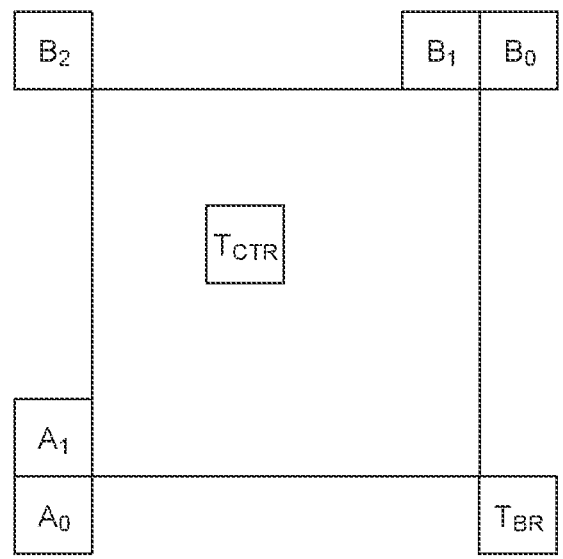
FIG. 1 shows the neighbouring PUs used to derive the spatial and temporal MVPs for both AMVP and Merge scheme.
Figure 2:
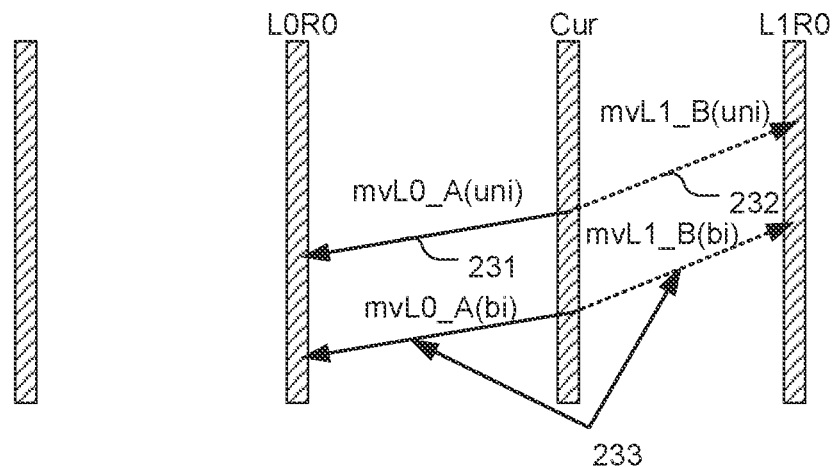
FIG. 2 illustrates an example of the derivation process for combined bi-predictive Merge candidate.
Figure 3:
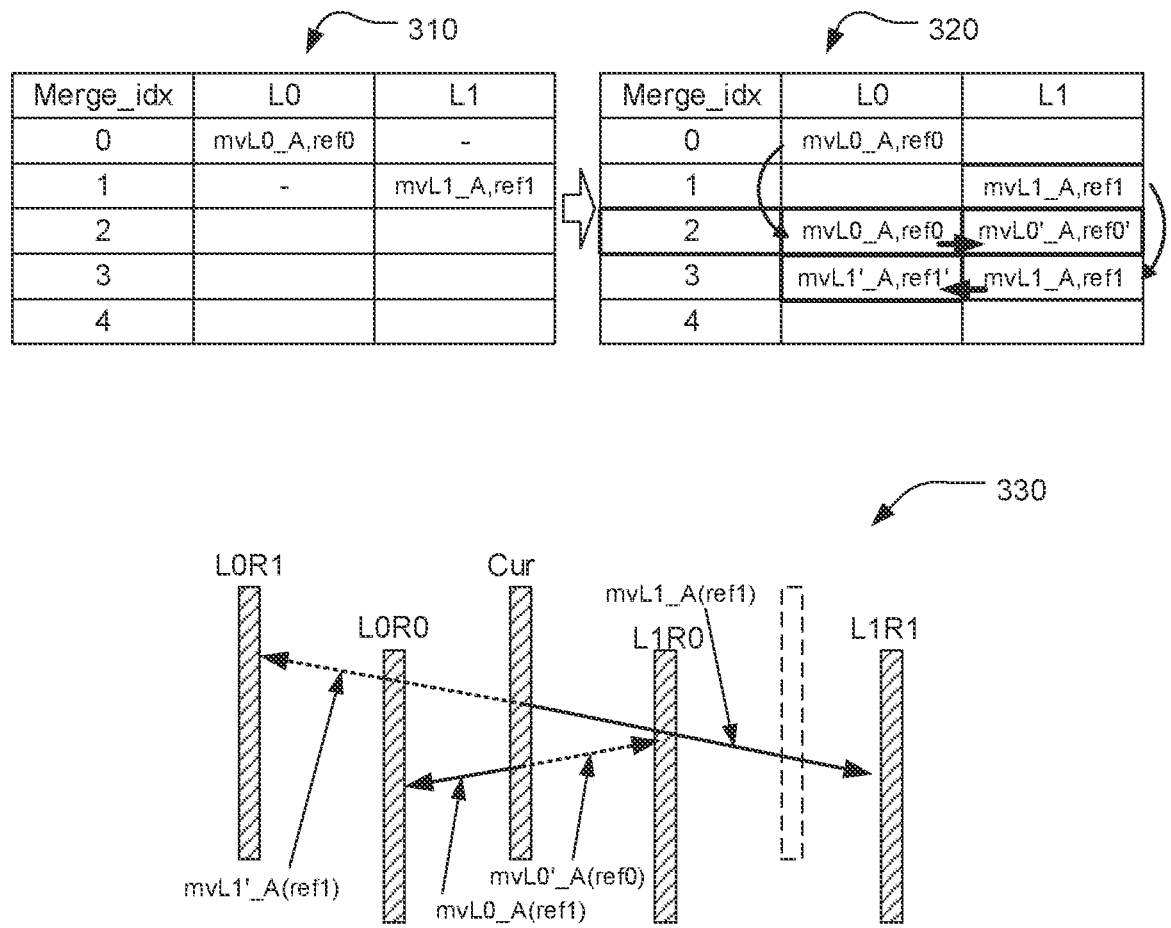
FIG. 3 illustrates an example of the derivation process of the scaled bi-predictive Merge candidate, where candidate list on the left corresponds to an original candidate list and the candidate list on the right corresponds to the expanded candidate list including two generated bi-prediction MVPs.
Figure 5A:
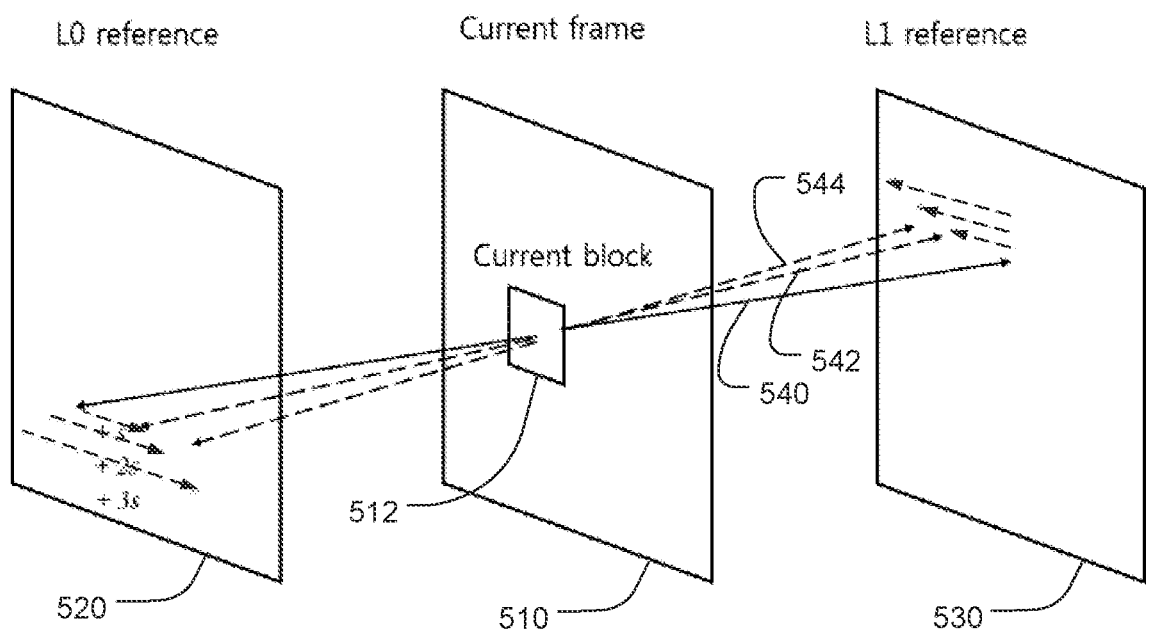
FIG. 5A illustrates an example of UMVE search process for a current block coded in bi-prediction.
Figure 5B:
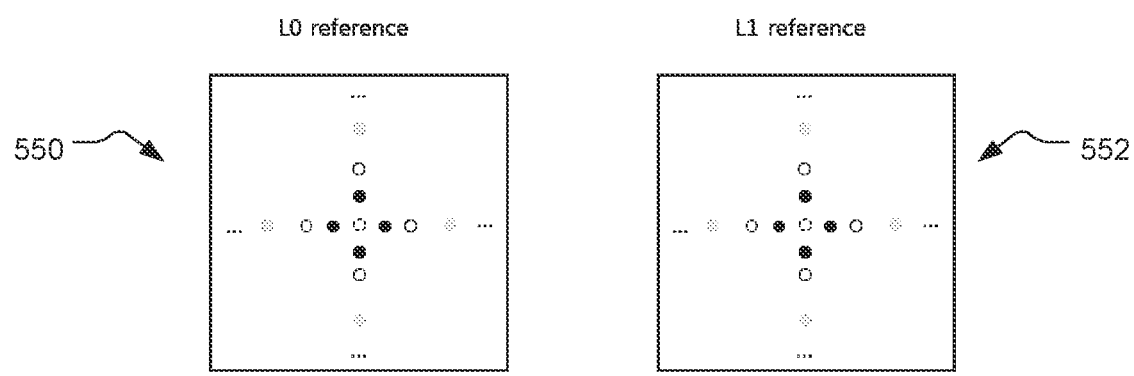
FIG. 5B illustrates an example of simplified search process for additional search candidates, where only specific locations around the centre point vertically and horizontally will be searched.

The following description is of the best-contemplated mode of carrying out the invention. This description is made for the purpose of illustrating the general principles of the invention and should not be taken in a limiting sense. The scope of the invention is best determined by reference to the appended claims.

Prediction Direction of UMVE Expansion

While the ultimate motion vector expression (UMVE) has shown to improve coding performance, it is desirable to further improve the performance. Accordingly, several methods to further improve ultimate motion vector expression are disclosed. In one embodiment, the prediction direction is fixed to be the same as that of the selected Merge candidate to be taken as a base candidate. Based on the selected Merge candidate in the Merge candidate list, several new MV candidates (or called extended candidates) can be generated by simply adding an offset to the corresponding MV and inserting it into Merge candidate list or AMVP candidate list or any other original Inter candidate list, such that an extended Inter candidate list can be formed for encoding or decoding. For example, based on the corresponding MV of the selected Merge candidate (MVx, MVy) with a prediction direction "uni-prediction" from List 0, four different MVs, such as (MVx+$\Delta$, MVy), (MVx−$\Delta$, MVy), (MVx, MVy+$\Delta$), (MVx, MVy−$\Delta$) can be generated by adding an offset to its x direction and y direction respectively. The prediction directions of those new candidates are still uni-prediction from List 0, which is the same as that of the selected Merge candidate (or called the base prediction direction of the base candidate). If the selected Merge candidate is bi-prediction, then the inserted Merge candidates are all bi-prediction candidates.

In another embodiment, based on the selected Merge candidates with uni-prediction in Merge candidate list, several new MV candidates can be generated by changing MV prediction direction from uni-prediction to bi-prediction and inserting new candidates with bi-prediction into Merge candidate list or AMVP candidate list or any other original Inter candidate list. In other words, the new MV candidates are always bi-prediction candidates. For example, based on the selected Merge candidate with uni-prediction in Merge candidate list, mirroring technique is used to generate the MV in the other list with the same temporal distance, or the MV in the other list with the nearest reference frame is generated by referencing the available MV. Next, a new candidate with bi-prediction will be inserted into Merge candidate list or AMVP list as a new candidate. In another embodiment, by changing candidates from uni-prediction to bi-prediction, a set of new candidates (or called extended candidates) can be generated by adding an offset to this changed MV. All extended candidates can be inserted into Merge candidate list or AMVP list. For example, based on the selected normal Merge candidate with uni-prediction from L0, we firstly change MV from uni-prediction to bi-prediction by mirroring technique and a new candidate is generated. Furthermore, more candidates can be generated by adding an offset to this MV with bi-prediction.

In another embodiment, based on the selected Merge candidate (MVx, MVy), two different MVs are generated by adding an offset, $\Delta$ to its x direction or y direction conditionally. The value of $\Delta$ can be pre-defined as a value or selected from a set. For example, [¼, ½, 1, 2, 4, 8, 16, 32, 64] can be a set of $\Delta$ and $\Delta$ can also be selected as ½. If the magnitude of MVx is larger than or equal to the magnitude of MVy, then the offset is added to MVx. Otherwise, the offset is added to MVy (for example, "MVy+ offset" and/or "MVy− offset") to be two different MVs. In one embodiment, if the magnitude of MVx is larger than or equal to the magnitude of MVy, then the offset is added to MVy. Otherwise, the offset is added to MVx to be two different MVs. In another embodiment, the offset with different steps are further classified into two groups. One is designed for the MV component with a larger magnitude. The other is designed for the MV component with a smaller magnitude. For example, the offset with a small step is applied to the MV component with a large magnitude. In another example, the offset with a large step is applied to the MV component with a large magnitude. The classification can depend on the magnitude of the step size, fractional pixels, integer pixels, or multiplied by some specific values. The classification can be interleaved. In another embodiment, the offset with different steps are further classified into several groups. The selection of offsets may depend on the magnitude of MV.

Since the offset adding operation is very similar to multiple MVD coding in AMVP mode, a set of offset value $\Delta$ can be defined to minimize their overlapping. Multiple MVD coding in AMVP mode is regarding to AMVR. The advantage of ultimate motion vector expression (UMVE) compared to AMVR is that UMVE does not need to code the reference index and MVP index for each list, since a new extended candidate is viewed as a Merge candidate. In one embodiment, a set of offset values, A can be predefined to be different for AMVR MV resolution. In JEM (Joint Exploration Model) being developed by Joint Video Exploration Team (WET) of ITU-T VCEG and ISO/IEC MPEG, AMVR is designed with MV resolution including quarter pel, integer pel and four pels. The offset value set can be defined as ½ pel, two pels, and eight pels which are exclusive with (or called different from) AMVR MV resolution. For example, [½, 2, 8, 16, 32, 64] can also be predefined as a set of offset value.

In another embodiment, previously decoded motion information can be used in Merge list and updated as in a first-in-first-out (FIFO) fashion. The above methods can be applied to these new Merge candidates.

Treating UMVE as an AMVP Mode

In the current design of ultimate motion vector expression (UMVE), UMVE is considered as a Merge mode. It will only be signalled if Merge flag or skip flag is enabled. However, the MVD modification technique of UMVE is very similar to AMVP applied with AMVR for different MVD resolution coding. Therefore, we propose to signal UMVE as an additional AMVP mode. In one embodiment, UMVE flag can be signalled before affine flag. For example, if Merge flag isn't enabled, a UMVE flag will be signalled. And that if UMVE is enabled on current CU, affine flag will not be inferred to be one pre-defined value and not signalled. In another embodiment, UMVE flag can also be signalled after affine flag. And that if affine flag is enabled, a UMVE flag will not be signalled.

Different Selection of UMVE Base Motion Vector

In the current design of UMVE, a Merge candidate list is used for selecting a UMVE's expansion. Only Merge candidates with a default Merge type (MRG_TYPE_DEFAULT_N) are considered for UMVE's expansion. Like normal Merge coding process, only a Merge candidate index is needed to be signalled and a decoder can reconstruct MV information (e.g. interDir), reference index, and MVP index by referring MV information of a neighbouring block. Although it is an efficient way for syntax signalling, the referenced MV is limited due to the limited candidates in a Merge candidate list. Therefore, except for using Merge candidates as UMVE's expansion, we propose to signal more motion information as those signalled in AMVP mode. In one embodiment, when UMVE is enabled, the interDir, reference frame index, and MVP index of motion information are signalled for an UMVE's expansion. For example, an MV from reference list 0 with reference frame index 1 is used as an UMVE's expansion. In another embodiment, an MV with uni-prediction can be transferred (or called converted) into bi-prediction by using mirroring technique and signalling to decoder with its reference list, reference frame index and MVP index. In some embodiments, the mirroring technique may further include a scaling operation. In another embodiment, an MV with uni-prediction can be converted into bi-prediction by a symmetric MVD (Motion Vector Difference) technique which adds MVD to the uni-prediction MV symmetrically (for example, "uni-prediction MV+MVD" and "uni-prediction MV−MVD) and signalling to the decoder with its reference list, reference frame index and MVP index. In another embodiment, we can only signal an MVP index for UMVE's expansion.

Multiple Direction of MVD for UMVE

There are four directions of MVD (e.g. [MVDx, 0], [−MVDx, 0], [0, MVDy], [0, −MVDy]) for the current UMVE design corresponding to four direction indexes. We propose to extend MVD to eight directions. An MVD can be added to the MV either to the x direction (or called horizontal direction) or y direction (or called vertical direction) or on both x and y directions at the same time (or called diagonal direction). In one embodiment, a fixed MVD value can be used for all directions. For example, a UMVE expansion of MV equal to [2, 3] can be extended to eight additional MVs with 1-pel MVD including [3, 3], [2, 4], [1, 3], [2, 2], [3, 4], [1, 2], [1, 4], [3, 2]. In another embodiment, one group of MVD values can be used for all directions and added MVD values are the same for each direction. For example, a UMVE expansion [2, 3] can be extended to 16 additional MVs with a MVD group [1-pel, 2-pel] and generate [3, 3], [2, 4], [1, 3], [2, 2], [3, 4], [1, 2], [1, 4], [3, 2], and [4, 3], [2, 5], [0, 3], [2, 1], [4, 5], [0, 1], [4, 1], [0, 5] by 1-pel MVD and 2-pel MVD respectively. In another embodiment, a group of MVD values can be used for all directions and furthermore, the design of MVD values can be dependent on different directions. For example, a group of MVDs (e.g. [2-pel, 8-pel]) is used for MV extension on top, left, bottom and right side. Another group of MVD (e.g. [1-pel, 4-pel]) is used for MV extension on both x direction and y direction. With these two MVD groups, a UMVE expansion of MV equal to [2, 3] can be extended to 16 additional MVs including 8 MVs generated by MVD group 1 (e.g. [4, 3], [2, 5], [0, 3], [2, 1], [10, 3], [2, 11], [−6, 3], [2, −5]) and 8 MVs generated by MVD group 2 (e.g. [3, 4], [1, 2], [1, 4], [3, 2], [6, 7], [−2, −1], [6, −1], [−2, 7]). In another embodiment, a group of MVD values can be used for all directions and the design of MVD values can be dependent on different directions. A diamond pattern can be used for extension by applying multi-group of MVDs. The values of MVD for top, left, bottom and right extension are designed to be larger than the other directions. For example, MVD group consisting of top, left, bottom and right extension can always be two times larger than the other MVD group consisting of other direction. A UMVE expansion of MV equal to [2, 3] can be extended by an MVD equal to 2-pel on top, left, bottom, and right direction to generate 4 additional MVs (e.g. [4, 3], [2, 5], [0, 3], [2, 1]). A MVD equal to 1-pel can be used for top-left, top-right, bottom-left and bottom-right direction to generate another 4 MVs (i.e., [3, 4], [1, 2], [1, 4], [3, 2]).

To further reduce the MVD syntax coding, in another embodiment, MVD can be derived from IMV flag, where IMV flag is used to indicate the MV resolution. For example, if IMV flag is coded to be 4-pel resolution, MVD of UMVE is set to be 4-pel and four or eight additional MVs can be generated by 4-pel MVD. For example, if IMV flag is coded to be 4-pel resolution, MVD of UMVE is set to be 4-pel for top, left, bottom, and right direction. Furthermore, 2-pel MVD can be used to extend UMVE's expansion to the other four directions, including top-right, top-left, bottom-right and bottom-left. However, either four, eight or larger number of extension directions can be used and MVD values are limited. Therefore, in another embodiment, we propose to signal an MVD value of UMVE as AMVP mode. In this way, the information of an MV including reference list, reference frame index and MVP index needs to be signalled. In another embodiment, to reduce syntax overhead and apply different MVD values for L0 and L1, we propose to signal an MVD value for L0 and derive another MVD value for L1 by applying mirroring technique from L0. Alternatively, a MVD value for L1 can be signalled and another MVD value for L0 can be derived by applying mirroring technique from L1. For example, an MVD for L0 is signalled with its reference frame index and MVP index. An MVD for L1 can be derived by using mirroring technique, and only its MVP index needs to be signalled. In another example, an MVD for L0 is signalled with its reference frame index and MVP index. An MVD for L1 can be derived by using mirroring technique, and neither its reference frame index nor its MVP index is needed to be signalled.

Combining Above Techniques

The methods mentioned above can be combined. For example, a UMVE mode is signalled as an additional AMVP mode and signalled after affine flag. Furthermore, only if affine flag is disable, a UMVE flag will be signalled or UMVE flag will be inferred to be a pre-defined value and not signalled. A UMVE index is used to indicate which Merge candidate from the normal Merge candidate list is applied to be a UVME. Also, an MVD will be signalled with all information of the MV including interDir, reference list, reference frame index and MVP index. In another example, a UMVE mode is signalled as an additional AMVP mode and signalled after affine flag. Furthermore, only if affine flag is disable, a UMVE flag will be signalled or UMVE flag will be inferred to be a pre-defined value and not signalled. If UMVE flag is enabled, information of the MV including interDir, reference list, reference frame index and MVP index will be signalled for a UMVE expansion. An MVD can be derived from IMV flag. If IMV flag is signalled to be 4-pel resolution, a MVD equal to 4-pel is used to extend UMVE's expansion for top, left, bottom, and right direction. An MVD equal to 2-pel can be used to extend UMVE's expansion for top-right, top-left, bottom-right, and bottom-left direction. In another example, a UMVE mode is signalled only if Skip or Merge flag is enabled. If UMVE mode is enabled, a UMVE index needs to be signalled to indicate which Merge candidate in a Merge candidate list is used as a UMVE expansion. And a MVD for UMVE expansion will be signalled with all information related to the MV including interDir, reference list, reference frame index and MVP index.

In another example, a UMVE mode is signalled only if Skip or Merge flag is enabled. If UMVE mode is enabled, a UMVE index is predefined or signalled to indicate which Merge candidate in a Merge candidate list is used as a UMVE expansion. Only an MVD for UMVE expansion will be signalled. All other information related to the MV including interDir, reference list, reference frame index and MVP index are the same as the Merge candidate. In another example, a UMVE mode is signalled only if Skip or Merge flag is enabled. If UMVE mode is enabled, a UMVE index is predefined or signalled to indicate which Merge candidate in a Merge candidate list is used as a UMVE. Only an MVD for UMVE expansion with different MVD values for different MVD directions will be signalled. All other information related to MV including interDir, reference list, reference frame index and MVP index are the same as the Merge candidate. When a diamond pattern MVD is applied, the MVD for top, left, bottom, and right extension is two times as large as the MVD for top-right, top-left, bottom-right, and bottom-left extension.

In current design of UMVE, a merge candidate list is used for selecting a UMVE's expansion. After a number of Merge candidates are selected as UMVE's expansions, a set of pre-defined MVD can be used for UMVE. The pre-defined MVDs have four different directions and multiple magnitudes. Furthermore, an MVD can be added to the MVs in list 0, list 1 or both. Therefore, a mirroring technique can be applied before UMVE expansion if a UMVE's expansion is a uni-prediction MV. To increase extended diversity of the MV, several methods are disclosed as follows.

Multiple MVD for UMVE's Expansion

We propose to extend MV in eight directions. An MVD can be added to an MV either in x direction or y direction (e.g. [MVx+MVDx, MVy], [MVx−MVDx, MVy], [MVx, MVy+MVDy], [MVx, MVy−MVDy]) and such MVD is called direction-1 MVD. An MVD can be added to an MV in both x and y directions at the same time, (e.g. [MVx+MVDx, MVy+MVDy], [MVx−MVDx, MVy−MVDy], [MVx+MVDx, MVy−MVDy], [MVx−MVDx, MVy−MVDy]) and such MVD is called direction-2 MVD. In one embodiment, different UMVE's expansion can be added with MVDs to an MV in different directions. For example, two Merge candidates (e.g. [1, 2], [3, 4]) are applied as UMVE's expansions. The first MV (e.g. [1, 2]) is extended by adding a set of MVDs, e.g. [1-pel, 2-pel] on direction-2, and four additional MVs will be generated by each MVD. For example, an MVD with value 1-pel can generate four MVs, including [0 (i.e., 1−1), 3 (i.e., 2+1)], [2 (i.e., 1+1), 3 (i.e., 2+1)], [0 (i.e., 1−1), 1 (i.e., 2−1)], [2 (i.e., 1+1), 1 (i.e., 2+1)]. The second MV (e.g. [3, 4]) is extended by adding a set of MVD (e.g. [1-pel, 2-pel]) in direction-1, and four additional MVs will be generated by each MVD. For example, an MVD with value 1-pel can generated four MVs, including [2, 4], [3, 5], [4, 4], [3, 3]. However, the first MV can be the first UMVE's expansion in expansion candidate list or a pre-defined order of UMVE's expansion, as shown in FIG. 6A and FIG. 6B. FIG. 6A illustrates an example of first UMVE, where the UMVE is extended by direction-2 MVD. FIG. 6B illustrates an example of second UMVE, where the UMVE is extended by direction-1 MVD.

In another embodiment, different UMVE's expansion can be added to MVDs in a different number of directions. For example, two merge candidates, e.g. [1, 2], [3, 4], are applied as UMVE's expansions. The first MV (e.g. [1, 2]) can be extended by adding an MVD (e.g. 1-pel) in both direction-1 and direction-2 MVDs. Eight additional MVs, including [2, 2], [1, 3], [0, 2], [1, 1], [2, 3], [0, 1], [2, 1], [0, 3] (shown in FIG. 7A) will be generated. The second MV (e.g. [3, 4]) can be extended by adding an MVD (e.g. 1-pel) in direction-1 MVD or in direction-2 MVD. Four additional MVs, including [2, 3], [4, 5], [2, 5], [4, 3] (shown in FIG. 7C) will be generated if direction-2 MVD is applied and [4, 4], [3, 5], [2, 4], [3, 3] (shown in FIG. 7B) will be generated if direction-1 MVD is applied. However, the first MV can be the first UMVE's expansion in expansion candidate list or a pre-defined order of UMVE's expansion.

In another embodiment, different UMVE's expansion can be added with a different set of MVDs. For example, two Merge candidates are applied as UMVE's expansion (e.g. [1, 2], [3, 4]). The first MV (e.g. [1, 2]) can be extended by adding a set of MVDs (e.g. [1-pel, 2-pel]) in direction-2. Eight additional MVs including [2, 3], [0, 1], [2, 1], [0, 3], [3, 4], [−1, 0], [3, 0], [−1, 4] (shown in FIG. 8A) will be generated. The second MV is extended by adding the other set of MVDs (e.g. [1-pel] in direction-2) so that four additional MVs including [4, 5], [2, 3], [2, 5], [4, 3] (shown in FIG. 8B) will be generated. However, the first MV can be the first UMVE's expansion in expansion candidate list or a pre-defined order of UMVE's expansion.

In another embodiment, MVDs with different magnitudes can be added to UMVE's expansion in different directions. For example, a UMVE's expansion (e.g. [1, 2]) can be extended by adding a MVD set (e.g. [1-pel, 2-pel, 4-pel]) in direction-1 MVD or direction-2 MVD, as shown FIG. 9A and FIG. 9B. In the first round, MVDs with value 1-pel can be added for UMVE's expansion (e.g. [1, 2]) in eight directions and eight additional MVs including [2, 2], [1, 3], [0, 2], [1, 1], [2, 3], [0,1], [2, 1], [0, 3] will be generated as shown by small triangles within the inner square 910 in FIG. 9A or the inner square 940 in FIG. 9B. In the second round, MVD with value 2-pel is used to added for UMVE's expansion in four directions in direction-2 and there are four additional MVs including [3, 4], [−1, 0], [3, 0], [−1, 4] will be generated as shown by small solid squares within the middle square 920 in FIG. 9A. In another example, in the second round, MVD with value 2-pel can be used to added for UMVE's expansion in four directions in direction-1 and there are four additional MVs including [3, 2], [1, 0], [1, 4], [−1, 2] will be generated as shown by small solid squares within the middle square 950 in FIG. 9B. In the third round, MVD with value 4-pel is used to added for UMVE's expansion in four directions in direction-2 and then four additional MVs including [5, 6], [−3, −2], [−3, 6], [5, −2] will be generated as shown by small circles within the outer square 930 in FIG. 9A. In another example, in the third round, MVD with value 4-pel is used to added for UMVE's expansion in four directions in direction-1 and then four additional MVs including [5, 2], [−3, 2], [1, 6], [1, −2] will be generated as shown by small circles within the outer square 960 in FIG. 9B.

In JEM, the MV predictor (MVP) generation in AMVP mode uses the same process for different MVD resolutions. The MV rounding and MV pruning are performed in the final step after inserting all spatial MVP candidates. It is proposed to perform the MV rounding (depending to the MV/MVD resolution) before the pruning process for each intended added MVP. In one embodiment, the MVPs are rounded to quarter sample precision for quarter luma sample MVD, and the MVPs are rounded to integer sample precision for integer-luma-sample MVD, and for four-luma-sample MVD, the MVPs are rounded to four-sample precision.

Regarding to Affine mode, there are two or three MVs in one MVP candidate depending on the number of control points in Affine mode. It is also proposed to perform the MV rounding before pruning process in Affine mode. In another embodiment, the MVPs are rounded to quarter sample precision for quarter-luma-sample MVD, and the MVPs are rounded to integer-sample precision for integer-luma-sample MVD, and for four-luma-sample MVD, the MVPs are rounded to four-sample precision.

Any of the foregoing proposed methods can be implemented in encoders and/or decoders. For example, any of the proposed methods can be implemented in inter coding of an encoder, and/or a decoder. Alternatively, any of the proposed methods can be implemented as a circuit coupled to the inter coding of the encoder and/or the decoder, so as to provide the information needed by the inter coding.

Figure 10:
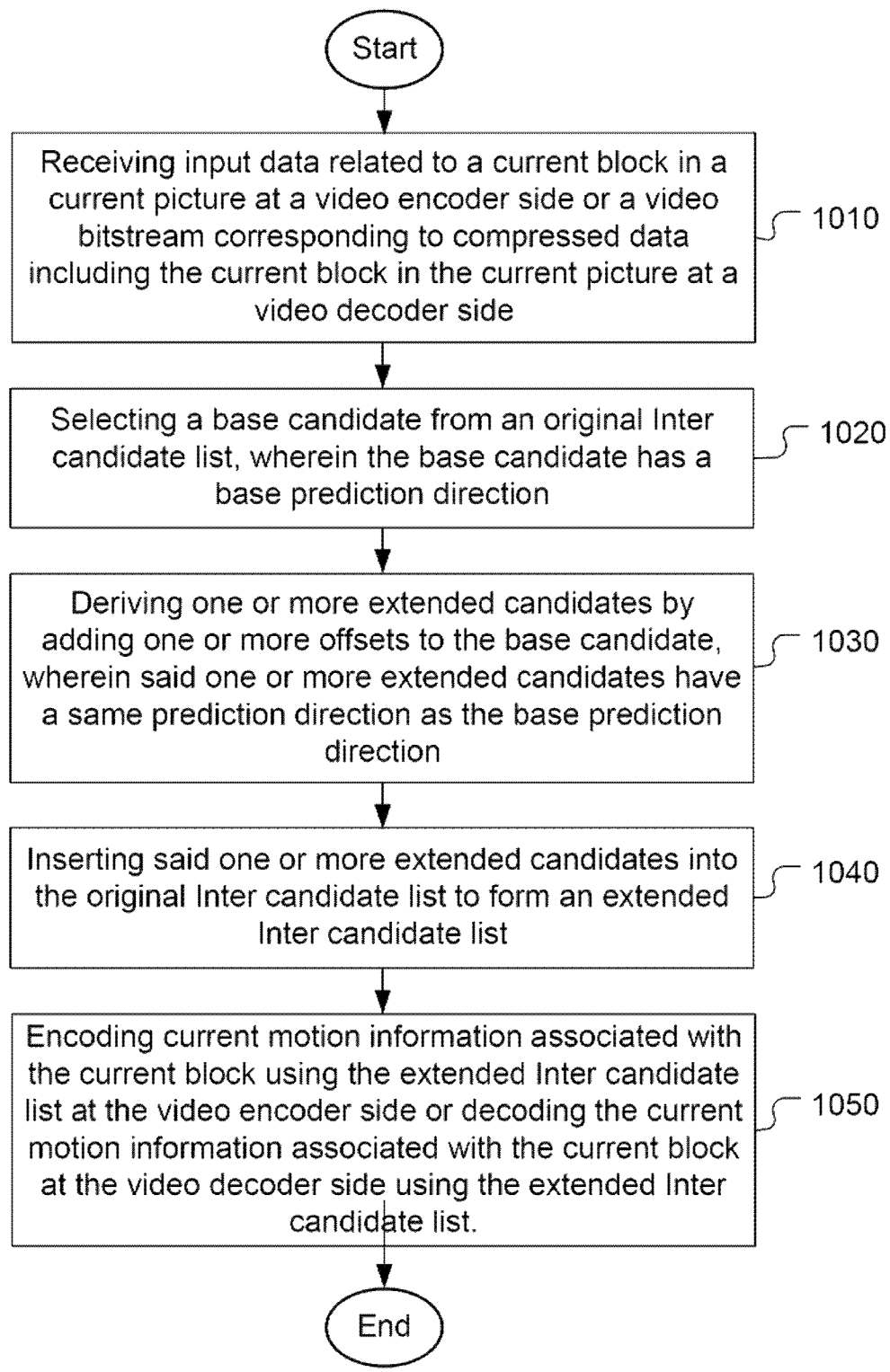
FIG. 10 illustrates a flowchart of an exemplary Inter prediction for video coding, where extended candidates have a same prediction direction as the base prediction direction according to an embodiment of the present invention.

FIG. 10 illustrates a flowchart of an exemplary Inter prediction for video coding, where extended candidates have a same prediction direction as the base prediction direction according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture are received at a video decoder side in step 1010. A base candidate is selected from an original Inter candidate list in step 1020, wherein the base candidate has a base prediction direction. One or more extended candidates are derived by adding one or more offsets to the base candidate in step 1030, wherein said one or more extended candidates have a same prediction direction as the base prediction direction. Said one or more extended candidates are inserted into the original Inter candidate list to form an extended Inter candidate list in step 1040. The current motion information associated with the current block is encoded using the extended Inter candidate list at the video encoder side or the current motion information associated with the current block is decoded at the video decoder side using the extended Inter candidate list in step 1050.

Figure 11:
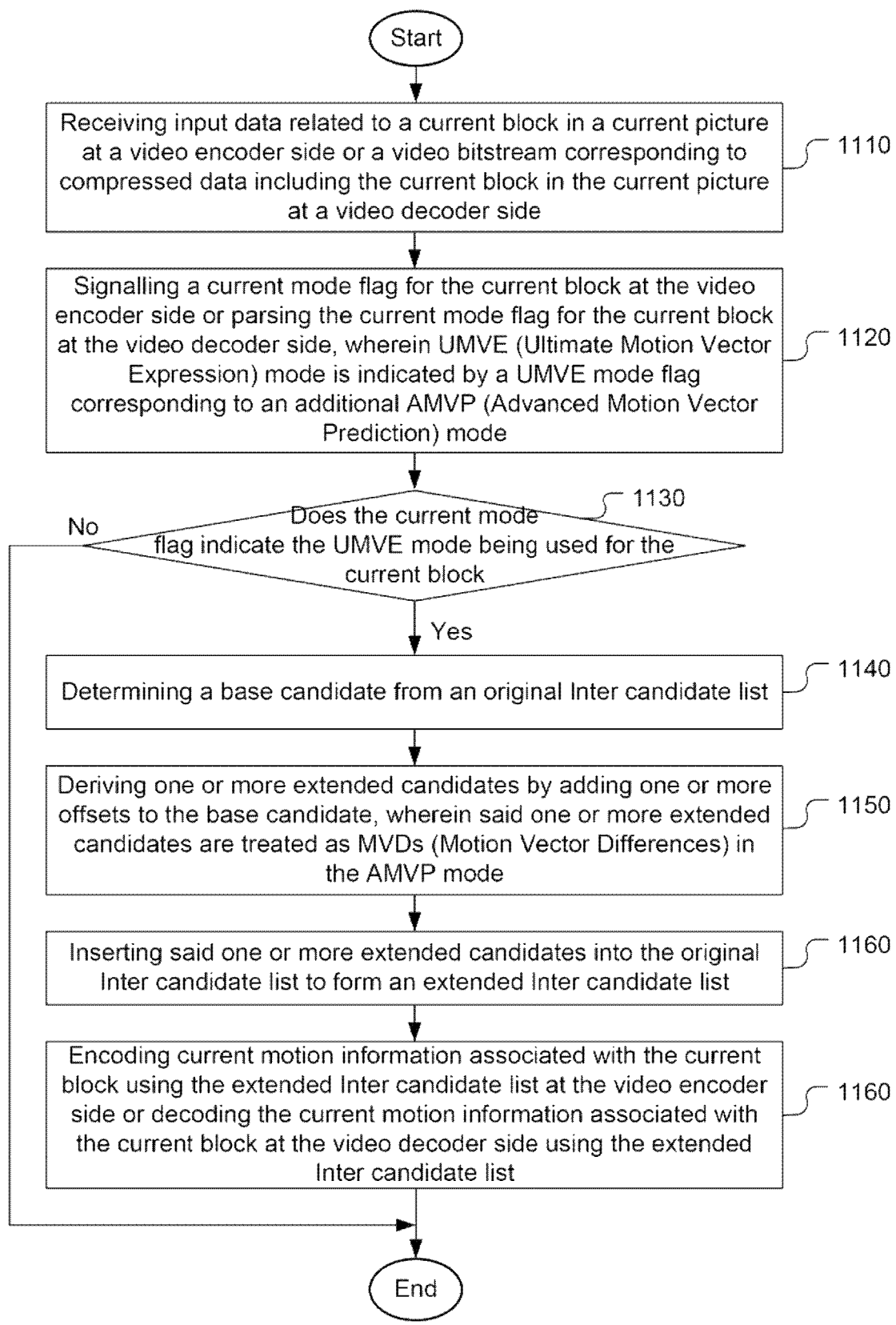
FIG. 11 illustrates a flowchart of an exemplary Inter prediction for video coding, where the UMVE expansion is signalled as an additional AMVP mode according to an embodiment of the present invention.

FIG. 11 illustrates a flowchart of an exemplary Inter prediction for video coding, where the UMVE expansion is signalled as an additional AMVP mode according to an embodiment of the present invention. According to this method, input data related to a current block in a current picture are received at a video encoder side or a video bitstream corresponding to compressed data including the current block in the current picture are received at a video decoder side in step 1110. A current mode flag for the current block is signalled at the video encoder side or the current mode flag for the current block is parsed at the video decoder side in step 1120, wherein UMVE (Ultimate Motion Vector Expression) mode is indicated by a UMVE mode flag corresponding to an additional AMVP (Advanced Motion Vector Prediction) mode. Whether the current mode flag indicates the UMVE mode being used for the current block is checked in step 1130. If the current mode flag indicates the UMVE mode being used for the current block (i.e., the "yes" path from step 1130), steps 1140 through 1170 are performed. Otherwise (i.e., the "no" path from step 1130), steps 1140 through 1170 are skipped. In step 1140, a base candidate from an original Inter candidate list is determined. In step 1150, one or more extended candidates are derived by adding one or more offsets to the base candidate, wherein said one or more extended candidates are treated as MVDs (Motion Vector Differences) in the AMVP mode. In step 1160, said one or more extended candidates are inserted into the original Inter candidate list to form an extended Inter candidate list. In step 1170, the current motion information associated with the current block is encoded using the extended Inter candidate list at the video encoder side or the current motion information associated with the current block is decoded at the video decoder side using the extended Inter candidate list.

The flowcharts shown are intended to illustrate examples of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Inter prediction for video coding, the method comprising:
receiving input data related to a current block in a current picture at a video encoder side or a video bitstream corresponding to compressed data including the current block in the current picture at a video decoder side;
selecting a base candidate from an original Inter candidate list, wherein the base candidate has a base prediction direction;
deriving one or more extended candidates by adding one or more offsets to the base candidate, wherein said one or more extended candidates have a same prediction direction as the base prediction direction, wherein said one or more offsets are selected from a selected group of offsets, and the selected group of offsets is selected from multiple available groups of offsets based on a parameter corresponding to precision;
generating extended motion information based on said one or more extended candidates; and
encoding current motion information associated with the current block using the extended motion information at the video encoder side or decoding the current motion information associated with the current block at the video decoder side using the extended motion information.

2. The method of claim 1, wherein said one or more offsets are added to the base candidate in multiple directions, and the multiple directions include one target direction being non-horizontal nor non-vertical.

3. The method of claim 2, wherein the multiple directions consist of eight directions including four horizontal and vertical directions and four diagonal directions.

4. The method of claim 2, wherein said one or more offsets correspond to a fixed offset.

5. The method of claim 2, wherein said one or more offsets correspond to a group of offsets.

6. The method of claim 1, wherein a value of said one or more offsets is selected depending on a target direction where said one or more offsets are added to the base candidate.

7. The method of claim 1, wherein a target direction for said one or more offsets to add to the base candidate depends on a target motion vector of the base candidate.

8. The method of claim 1, wherein a number of said one or more offsets depends on a target motion vector of the base candidate.

9. The method of claim 1, wherein a number of said one or more offsets depends on a target direction where said one or more offsets are added to the base candidate.

10. The method of claim 1, wherein when AMVR (adaptively motion vector resolution) is applied to the current block, said one or more offsets are selected to have a different magnitude from a precision selected by the AMVR.

11. The method of claim 10, wherein when the AMVR is applied to the current block, said one or more offsets are selected according to a flag indicating the precision selected by the AMVR.

12. The method of claim 1, wherein said one or more extended candidates are inserted into an extended Inter candidate list and the extended Inter candidate list is updated in a first-in-first-out (FIFO) fashion.

13. The method of claim 1, wherein only a target uni-prediction candidate in the original Inter candidate list is selected as the base candidate and the target uni-prediction candidate is converted into a bi-prediction base candidate using a mirroring technique for deriving said one or more extended candidates.

14. The method of claim 1, wherein said one or more offsets are added to the base candidate in x-direction or y-direction conditionally.

15. The method of claim 1, wherein the original Inter candidate list is derived for Skip, Merge, AMVP, affine Merge mode, affine AMVP mode, or sub-block Merge mode.

16. An apparatus of Inter prediction for video coding, the apparatus of Inter prediction for video coding comprising one or more electronic circuits or processors arranged to:
receive input data related to a current block in a current picture at a video encoder side or a video bitstream corresponding to compressed data including the current block in the current picture at a video decoder side;
select a base candidate from an original Inter candidate list, wherein the base candidate has a base prediction direction;
derive one or more extended candidates by adding one or more offsets to the base candidate, wherein said one or more extended candidates have a same prediction direction as the base prediction direction, wherein said one or more offsets are selected from a selected group of offsets, and the selected group of offsets is selected from multiple available groups of offsets based on a parameter corresponding to precision;
generating extended motion information based on said one or more extended candidates; and
encode current motion information associated with the current block using the extended motion information at the video encoder side or decode the current motion information associated with the current block at the video decoder side using the extended motion information.

* * * * *